United States Patent [19]
Massingill et al.

[11] Patent Number: 5,978,366
[45] Date of Patent: Nov. 2, 1999

[54] METHODS AND SYSTEMS FOR REDUCED POWER OPERATION OF CELLULAR MOBILE TERMINALS

[75] Inventors: Larry William Massingill, Selma; Stan L. Reinhold; Richard E. Weiss, both of Cary; Torbjörn Wilson Sölve, Cary, all of N.C.

[73] Assignee: Ericsson Inc., Research Triangle Park, N.C.

[21] Appl. No.: 08/770,259

[22] Filed: Dec. 20, 1996

[51] Int. Cl.[6] ..................................................... H04B 1/16
[52] U.S. Cl. .......................... 370/337; 370/311; 455/343
[58] Field of Search ..................................... 370/321, 347, 370/349, 337, 336, 338, 401, 465, 311; 455/38.3, 343, 458

[56] References Cited

U.S. PATENT DOCUMENTS

| | | | |
|---|---|---|---|
| 4,351,983 | 9/1982 | Crouse et al. ................................ | 179/1 |
| 4,532,636 | 7/1985 | Wilkinson ................................... | 375/1 |
| 4,849,750 | 7/1989 | Andros et al. ...................... | 340/825.44 |
| 4,995,099 | 2/1991 | Davis ....................................... | 455/343 |
| 5,109,528 | 4/1992 | Uddenfeldt ............................. | 455/33.2 |
| 5,150,361 | 9/1992 | Wieczorek et al. ...................... | 370/337 |
| 5,199,031 | 3/1993 | Dahlin ..................................... | 370/329 |
| 5,224,152 | 6/1993 | Harte ........................................ | 455/343 |
| 5,241,542 | 8/1993 | Natarajan et al. ....................... | 455/343 |
| 5,278,831 | 1/1994 | Mabey et al. ............................ | 455/343 |
| 5,299,198 | 3/1994 | Kay et al. ................................ | 370/95.3 |
| 5,381,133 | 1/1995 | Erhart et al. ........................ | 340/825.44 |
| 5,404,355 | 4/1995 | Raith ........................................ | 370/311 |
| 5,428,668 | 6/1995 | Dent et al. ................................ | 379/59 |
| 5,475,712 | 12/1995 | Sasaki ...................................... | 375/241 |
| 5,513,183 | 4/1996 | Kay et al. ................................ | 370/95.3 |
| 5,537,509 | 7/1996 | Swaminathan et al. ................ | 395/2.37 |
| 5,539,858 | 7/1996 | Sasaki et al. ............................ | 395/2.21 |
| 5,541,976 | 7/1996 | Ghisler .................................... | 455/343 |
| 5,570,369 | 10/1996 | Jokinen .................................... | 370/311 |
| 5,606,728 | 2/1997 | Keba et al. .............................. | 455/343 |
| 5,740,517 | 4/1998 | Aoshima .................................. | 370/311 |
| 5,831,544 | 11/1998 | Park ......................................... | 455/343 |

FOREIGN PATENT DOCUMENTS

| | | | |
|---|---|---|---|
| 0347355A1 | 12/1989 | European Pat. Off. ......... | H04H 1/00 |
| 655872 | 5/1995 | European Pat. Off. . | |
| 0655872A2 | 5/1995 | European Pat. Off. ......... | H04Q 7/32 |
| 42 16 911 A1 | 11/1992 | Germany . | |
| 2 288 102 | 4/1995 | United Kingdom . | |
| 2290399 | 12/1995 | United Kingdom ............. | H04Q 7/18 |
| WO87/05458 | 9/1987 | WIPO ............................. | H04Q 7/02 |
| WO90/06634 | 6/1990 | WIPO ............................. | H04B 1/16 |
| WO95/31047 | 11/1995 | WIPO ............................. | H04B 1/16 |

OTHER PUBLICATIONS

PCT International Search Report, PCT/US98/21122, Sep. 28, 1998.

*Primary Examiner*—Chi H. Pham
*Assistant Examiner*—Frank Duong
*Attorney, Agent, or Firm*—Myers Bigel Sibley & Sajovec

[57] ABSTRACT

A method and apparatus for reducing power consumption in a mobile terminal having a receiver for receiving a time multiplexed message distributed over a plurality of time slots by receiving a first subset of the plurality of time slots so as to receive a first portion of the time multiplexed message corresponding to the first subset of the plurality of time slots. The mobile terminal then determines from the first portion of the time multiplexed message if additional time slots of the time multiplexed message need to be received by the mobile terminal. The mobile terminal receives a second subset of the plurality of time slots so as to receive a second portion of the time multiplexed message if the mobile terminal determines from the first portion that additional portions of the time multiplexed message are to be received by the mobile terminal. This first portion of the message is preferably independently decodeable from the remainder of the message.

39 Claims, 8 Drawing Sheets

METHODS AND SYSTEMS FOR REDUCED POWER OPERATION OF CELLULAR MOBILE TERMINALS

This application is related to co-pending and commonly assigned application Ser. No. 08/564,420, filed Nov. 29, 1995, the disclosure of which is incorporated by reference herein in its entirety.

FIELD OF THE INVENTION

This invention relates to communication systems and more particularly to communication systems utilizing a wide area cellular network.

BACKGROUND OF THE INVENTION

Public cellular networks (public land mobile networks) are commonly employed to provide voice and data communications to a plurality of subscribers. For example, analog cellular radiotelephone systems, such as designated AMPS, ETACS, NMT-450, and NMT-900, have been deployed successfully throughout the world. More recently, digital cellular radiotelephone systems such as designated IS-54B in North America and the pan-European GSM system have been introduced. These systems, and others, are described, for example, in the book titled *Cellular Radio Systems* by Balston, et al., published by Artech House, Norwood, Mass., 1993.

Traditional analog radiotelephone systems generally employ a system referred to as frequency division multiple access (FDMA) to create communications channels. As a practical matter well-known to those skilled in the art, radiotelephone communications signals, being modulated waveforms, typically are communicated over predetermined frequency bands in a spectrum of carrier frequencies. These discrete frequency bands serve as channels over which cellular radiotelephones communicate with a cell, through the base station or satellite serving the cell. In the United States, for example, Federal authorities have allocated to cellular communications a block of the UHF frequency spectrum further subdivided into pairs of narrow frequency bands, a system designated EIA-553 or IS-19B. Channel pairing results from the frequency duplex arrangement wherein the transmit and receive frequencies in each pair are offset by 45 MHZ. At present there are 832, 30-kHz wide, radio channels allocated to cellular mobile communications in the United States.

The limitations on the number of available frequency bands present several challenges as the number of subscribers increases. Increasing the number of subscribers in a cellular radiotelephone system generally requires more efficient utilization of the limited available frequency spectrum in order to provide more total channels while maintaining communications quality. This challenge is heightened because subscribers may not be uniformly distributed among cells in the system. More channels may be needed for particular cells to handle potentially higher local subscriber densities at any given time. For example, a cell in an urban area might conceivably contain hundreds or thousands of subscribers at any one time, easily exhausting the number of frequency bands available in the cell.

For these reasons, conventional cellular systems employ frequency reuse to increase potential channel capacity in each cell and increase spectral efficiency. Frequency reuse involves allocating frequency bands to each cell, with cells employing the same frequencies geographically separated to allow radiotelephones in different cells to simultaneously use the same frequency without interfering with each other. By so doing, many thousands of subscribers may be served by a system of only several hundred frequency bands.

Another technique which may further increase channel capacity and spectral efficiency is time division multiple access (TDMA). A TDMA system may be implemented by subdividing the frequency bands employed in conventional FDMA systems into sequential time slots. Although communication on frequency bands typically occur on a common TDMA frame that includes a plurality of time slots, communications on each frequency band may occur according to a unique TDMA frame, with time slots unique to that band. Examples of systems employing TDMA are the dual analog/digital IS-54B standard employed in the United States, in which each of the original frequency bands of EIA-553 is subdivided into 3 time slots, and the European GSM standard, which divides each of its frequency bands into 8 time slots. In these TDMA systems, each user communicates with the base station using bursts of digital data transmitted during the user's assigned time slots.

A channel in a TDMA system typically includes one or more time slots on one or more frequency bands. As discussed above, traffic channels are used to communicate voice, data or other information between users, for example, between a mobile terminal such as a radiotelephone and a network base station. In this manner, each traffic channel forms one direction of the duplex communications link established by the system from one user to another. Traffic channels typically are dynamically assigned by the system when and where needed. In addition, systems such as the European GSM system, may "frequency hop" traffic channels, i.e., randomly switch the frequency band on which a particular traffic channel is transmitted. Frequency hopping reduces the probability of interference events between channels, using interferer diversity and averaging to increase overall communications quality.

Typically included in the dedicated control channels transmitted in a cell are forward control channels which are used to broadcast control information in a cell of the wide area cellular network to radiotelephones which may seek to access the network. The control information broadcast on a forward control channel may include such things as the cell's identification, an associated network identification, system timing information and other information needed to access the wide area cellular network from a radiotelephone.

Forward control channels, such as the Broadcast Control Channel (BCCH) of the GSM standard, typically are transmitted on a dedicated frequency band in each cell. A radiotelephone seeking access to a system generally "listens" to a control channel in standby mode, and is unsynchronized to a base station or satellite until it captures a base station or satellite control channel. In order to prevent undue interference between control channels in neighboring cells, frequency reuse is conventionally employed, with different dedicated frequency bands being used for the control channel in neighboring cells, according to a frequency reuse pattern that guarantees a minimum separation between cochannel cells. Frequency hopping, which might allow denser reuse of control channel frequency bands, is typically not employed because an unsynchronized radiotelephone generally would have difficulty capturing a frequency-hopped control channel due to lack of a reference point for the frequency hopping sequence employed.

Because a mobile terminal must "listen" to the control channel even when not in use for a communication, the mobile terminal must expend energy. Management of energy expenditures are, therefore, critical to extend the operational duration of either a battery or rechargeable power source in a mobile terminal. Thus, many mobile terminals enter a "sleep mode" when not originating or receiving a call. However, in the sleep mode the mobile terminal must still monitor a paging channel to avoid missing an incoming call. To maximize sleep mode efficiency, the mobile station should be able to detect whether the received messages are relevant messages or irrelevant messages as early as possible in the receive processing so as to avoid as many signal processing steps as possible. Once an irrelevant message is detected, the mobile station can immediately return to sleep. To appreciate the possible power savings from an early detection of irrelevant pages, consider a typical page channel in which a paging message is sent once per second. This means that there are 60*60*24=86,400 page messages sent to the mobile terminal each day. If, for example, only 1% of these messages are relevant, the mobile station can avoid processing 99% of the page messages if it can detect the irrelevant messages. Thus, the mobile terminal effectively can be in sleep mode for the majority of the message reception time of the terminal.

However, currently in order to determine if a message is relevant, the entire message must be received and, at least partially, processed. This receipt process alone requires the mobile terminal to expend unnecessary energy if the message is irrelevant. Accordingly, in view of the above discussion there exists a need for further developments in power conservation in mobile terminals.

SUMMARY OF THE INVENTION

In view of the above discussion, it is an object of the present invention to provide improved power conservation in a mobile terminal.

A further object of the present invention is to provide reduced power consumption without increasing latency of receiving messages.

In light of the above objects, the present invention provides for reducing power consumption in a mobile terminal having a receiver for receiving a time multiplexed message distributed over a plurality of time slots by receiving a first subset of the plurality of time slots so as to receive a first portion of the time multiplexed message corresponding to the first subset of the plurality of time slots. The mobile terminal then determines from the first portion of the time multiplexed message if additional time slots of the time multiplexed message need to be received by the mobile terminal. The mobile terminal receives a second subset of the plurality of time slots so as to receive a second portion of the time multiplexed message if the mobile terminal determines from the first portion that additional portions of the time multiplexed message are to be received by the mobile terminal. The first portion of the message is preferably, therefore, independently decodeable from the remainder of the message.

In one embodiment of the present invention, an address is associated with the mobile terminal and the time multiplexed message contains an address specifying the intended recipient of the message. In such an embodiment, the mobile terminal may determine from the first portion of the message if the time multiplexed message is addressed to a mobile terminal having an address in a range of addresses which includes the mobile terminal and only receive additional time slots if the address of the mobile terminal is within the range of addresses.

Alternatively, when the mobile unit identifier includes a plurality of bits the first portion of the time multiplexed message may contain a subset of the plurality of bits of a mobile unit identifier of the intended recipient of the message. The mobile terminal may then determine if the subset of the plurality of bits contained in the first portion of the time multiplexed message are identical to a corresponding subset of the plurality of bits of the mobile unit identifier of the mobile terminal and only receive the remainder of the message if the bits are identical. The subset of bits of the mobile unit identifier may be selected from the plurality of bits such that a random distribution of possible mobile unit identifier values is obtained from a distribution of mobile terminals.

In certain embodiments of the present invention, the time multiplexed message comprises a paging message. The time multiplexed message may also be a broadcast message. In such a case, the mobile terminal may determine from the first portion of the message if the time multiplexed message is a newer version of a previously received time multiplexed message and only receive the remainder of the message if the version is newer.

By receiving only a portion of a message and determining if the remainder of the message is to be received, the present invention allows a mobile terminal to reduce the amount of energy expended receiving messages. Furthermore, the energy utilized to process an entire message may be conserved because only a portion of the message need be processed. The present invention is particularly well suited for use with paging messages where a mobile terminal typically monitors all paging messages to avoid missing an incoming call.

As will be appreciated by those of skill in the art, the present invention may be embodied as a method or apparatus.

BRIEF DESCRIPTION OF THE DRAWINGS

FIG. 2 graphically illustrates a channel in a time multiplexed communication system;

FIG. 3 graphically illustrates a frame in a time multiplexed communication system;

FIG. 4 graphically illustrates the composition of a frame in a GSM compliant communication system;

FIG. 5 graphically illustrates the composition of a control multi-frame in a GSM compliant communication system;

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods of devices. Accordingly, the present invention may take the form of an entirely hardware embodiment, an entirely software embodiment or an embodiment combining software and hardware aspects.

For purposes of understanding the present invention, the wide area cellular network will be described with reference to the GSM cellular system standard. However, as will be appreciated by those of skill in the art, the advantages and benefits of the present invention may also be obtained in other communications protocols and, accordingly, the present invention should not be construed as limited to the GSM protocol.

Figure 1:
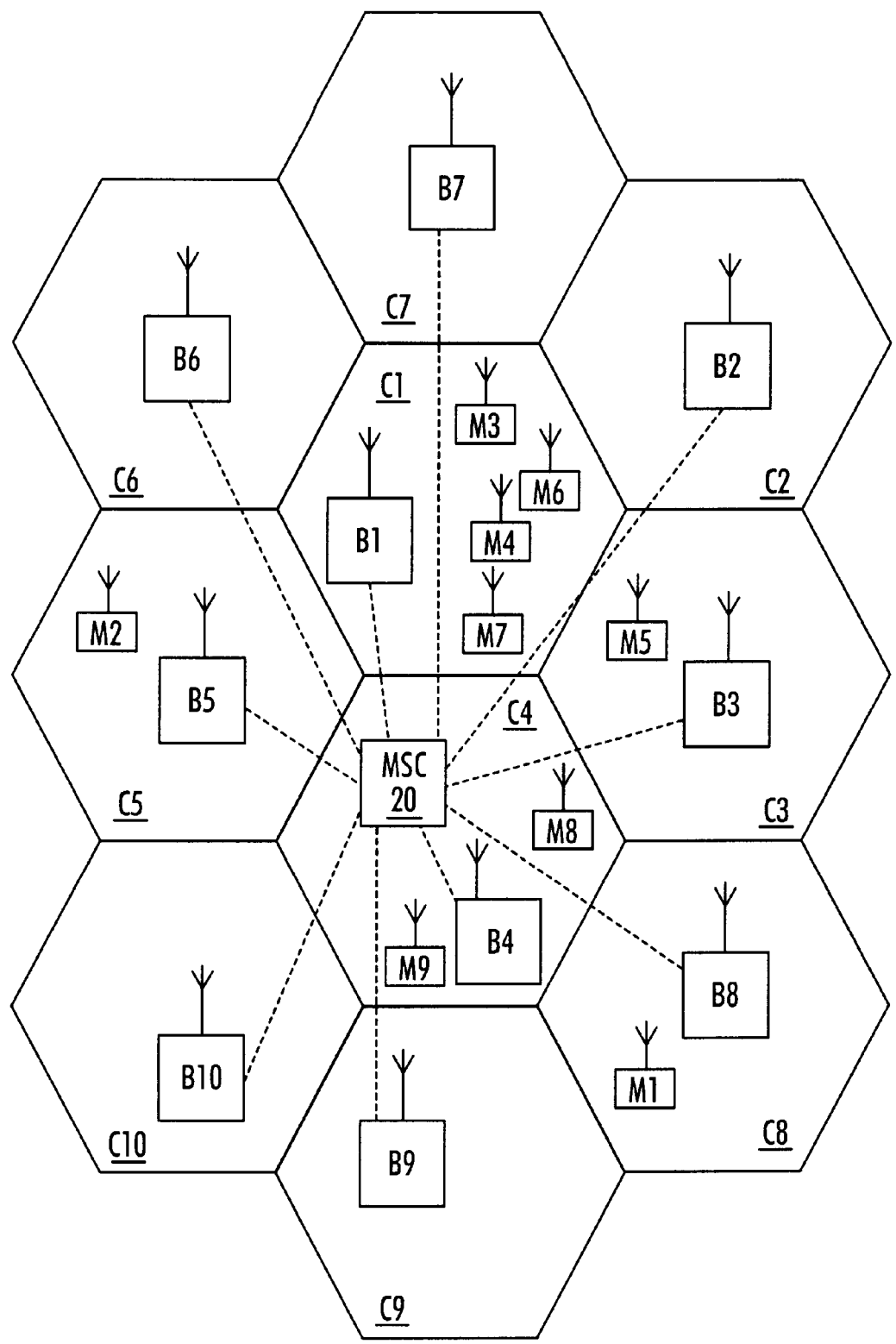
FIG. 1 illustrates the architecture of a cellular radio system suitable for use with the present invention.

A wide area cellular network utilizing the present invention is illustrated in FIG. 1. In a cellular radio system as shown in FIG. 1, a geographical area (e.g., a metropolitan area) is divided into several smaller, contiguous radio coverage areas (called "cells") such as cells C1–C10. The cells C1–C10 are served by a corresponding group of fixed radio stations (called "base stations") B1–B10, each of which operates on a subset of the radio frequencies (RF) assigned to the system. The frequencies allocated to any given cell may be reallocated to a distant cell in accordance with a frequency reuse pattern as is well known in the art. In each cell, at least one frequency (called the "control" or "paging/access" channel) is used to carry control or supervisory messages, and the other frequencies (called the "voice" or "speech" channels) are used to carry voice conversations. The cellular telephone users (mobile subscribers) in the cells C1–C10 are provided with portable (hand-held), transportable (hand-carried) or mobile (car-mounted) telephone units (mobile terminals) such as mobile terminals M1–M9, each of which communicates with a nearby base station. The base stations B1–B10 are connected to and controlled by a mobile services switching center (MSC) 20. The MSC 20, in turn, is connected to a central office (not shown in FIG. 1) in the landline (wireline) public switched telephone network (PSTN) or to a similar facility such as an integrated system digital network (ISDN). The MSC 20 switches calls between and among wireline and mobile subscribers, controls signaling to the mobile terminals, compiles billing statistics, and provides for the operation, maintenance and testing of the system.

In the United States, two different entities are licensed to operate cellular systems in each major metropolitan statistical area (MSA). To receive service, a mobile subscriber enters into a subscription agreement with one of these local operators (the local system from which service is subscribed is called the "home" system). When traveling outside the home system (called "roaming"), a mobile subscriber may be able to obtain service in a distant (called "visited") system if there is a roaming agreement between the operators of the home and visited systems. Access to a cellular system by any of the mobile terminals M1–M9 is controlled on the basis of a mobile identification number (MIN) which is assigned to each mobile subscriber by the home system operator, and the electronic serial number (ESN) which is permanently stored in the mobile station (the so-called "MIN/ESN pair"). The MIN/ESN pair is sent from the mobile station when originating a call and its validity is checked by the MSC 20. If the MIN/ESN pair is determined to be invalid, the system may deny access to the mobile station. The MIN is also sent from the system to the mobile station when alerting the mobile station of an incoming call.

When turned on (powered up), each of the mobile terminals M1–M9 enters the idle state (standby mode) and tunes to and continuously monitors the strongest control channel (generally, the control channel of the cell in which the mobile station is located at that moment). When moving between cells while in the idle state, the mobile station will eventually "lose" radio connection on the control channel of the "old" cell and tune to the control channel of the "new" cell. The initial tuning to, and the change of, control channel are both accomplished automatically by scanning all the control channels in operation in the cellular system to find the "best" control channel. When a control channel with good reception quality is found, the mobile station remains tuned to this channel until the quality deteriorates again. In this manner, the mobile station remains "in touch" with the system and may receive or initiate a telephone call through one of the base stations B1–B10 which is connected to the MSC 20.

To detect incoming calls, the mobile station continuously monitors the control channel to determine whether a page message addressed to it (i.e., containing its MIN) has been received. A page message will be sent to the mobile station, for example, when an ordinary (landline) subscriber calls the mobile subscriber. The call is directed from the PSTN to the MSC 20 where the dialed number is analyzed. If the dialed number is validated, the MSC 20 requests some or all of the base stations B1–B10 to page the called mobile station throughout their corresponding cells C1–C10. Each of the base stations B1–B10 which receive the request from the MSC 20 will then transmit over the control channel of the corresponding cell a page message containing the MIN of the called mobile station. Each of the idle mobile terminals M1–M9 which is present in that cell will compare the MIN in the page message received over the control channel with the MIN stored in the mobile station. The called mobile terminal with the matching MIN will automatically transmit a page response over the control channel to the base station which then forwards the page response to the MSC 20. Upon receiving the page response, the MSC 20 selects an available voice channel in the cell from which the page response was received (the MSC 20 maintains an idle channel list for this purpose), and requests the base station in that cell to order the mobile station via the control channel to tune to the selected voice channel. A through-connection is established once the mobile station has tuned to the selected voice channel.

When, on the other hand, a mobile subscriber initiates a call (e.g., by dialing the telephone number of an ordinary subscriber and pressing the "send" button on the telephone handset in the mobile station), the dialed number and MIN/ESN pair for the mobile station are sent over the control channel to the base station and forwarded to the MSC 20 which validates the mobile station, assigns a voice channel and establishes a through-connection for the conversation as described before.

If the mobile station moves between cells while in the conversation state, the MSC 20 will perform a "handoff" of the call from the old base station to the new base station. The MSC 20 selects an available voice channel in the new cell and then orders the old base station to send to the mobile station on the current voice channel in the old cell a handoff message which informs the mobile station to tune to the selected voice channel in the new cell. The handoff message is sent in a "blank and burst" mode which causes a short but hardly noticeable break in the conversation. Upon receipt of the handoff message, the mobile station tunes to the new voice channel and a through-connection is established by the MSC 20 via the new cell. The old voice channel in the old cell is marked idle in the MSC 20 and may be used for another conversation.

The communication network illustrated in FIG. 1 preferably employs a digital standard employing time multiplexed messages. For example, the GSM system utilized time divided carriers for messaging. FIG. 2 illustrates the time division of a carrier. As illustrated in FIG. 2 the carrier may be divided into 1 to n fixed length time periods known as burst periods. Each of these burst periods may be considered a time slot of the time divided carrier.

As seen in FIG. 3, a group of sequential time slots may be divided into a frame. A frame consists of m time slots. These time slots are typically designated from 0 to m−1. Also as illustrated in FIG. 3, frames may repeat such that time slot 0 in Frame 1 corresponds to time slot 0 in Frame 2. In a typical time multiplexed system, a mobile terminal transmits and receives during only one of the time slots of a frame. Thus, a mobile terminal may go inactive during the remainder of the time slots and thereby conserve energy.

In a GSM system, as illustrated in FIG. 4, a frame consists of 8 time slots labeled 0 through 7. Communications between the base station B1 through B10 and the mobile terminals M1 through M9 are typically divided into two types, traffic channels and common channels. Traffic channels include twenty-six GSM frames in what is referred to as a multi-frame. Common channels include fifty-one GSM frames in a multi-frame. The present invention will be described with respect to the fifty-one frame control channel multi-frame illustrated in FIG. 5.

As illustrated in FIG. 5, a GSM multi-frame may include fifty-one frames which are numbered sequentially from 0 to 50. In FIG. 5 the types of information or function of each frame is noted such that frames designated F indicate a frequency correction burst, frames designated S indicate a synchronization burst, frames designated BCCH indicate a broadcast control channel, frames designated CCCH represent instances of a common control channel and frames designated I represent an idle burst. FIG. 5 illustrates the designation for one time slot of each frame depicted such that, for example, the CCCH associated with frames 6 to 9 would represent a message encoded over 4 time slots as time slot 0 of each of the frames which make up the CCCH.

In operation, a mobile terminal M1 is notified of an incoming call by a paging message which is transmitted in what is referred to as a paging channel (PCH). A PCH is carried on one or more instances of a CCCH, as defined in information carried on the BCCH. A specific PCH may repeat after between 2 and 9 multi-frames. Thus, because there are up to 9 CCCH's per 51 frame multi-frame and these CCCH's repeat at a specified interval of from 2 to 9 multi-frames, up to 81 uniquely identifiable PCH's may be specified.

A mobile terminal such as M1 is assigned by a base station, such as B1, one of the uniquely identified PCH's as its paging channel. A large part of the time that a mobile terminal M1 is in use, the mobile terminal M1 is in a standby or sleep mode where the terminal is waiting for incoming calls. To avoid missing an incoming call and reduce latency in acknowledging incoming calls, the mobile terminal M1 monitors each occurrence of the assigned PCH for paging messages directed to the mobile terminal M1. In a conventional GSM system the paging message is convolutionally coded over the entire CCCH such that the mobile terminal must receive all four time slots of the PCH to decode the paging message. Thus, in a conventional system, the mobile terminal M1 receives and decodes all four time slots of the assigned PCH each occurrence of the assigned PCH.

In contrast to a conventional system, the system of the present invention allows the mobile terminal M1 to receive only a portion of the time slots associated with an assigned PCH and then determines if additional time slots should be received. Power consumption in the mobile terminal is reduced by selectively controlling the receiver and signal processing of the mobile terminal. Thus, the mobile terminal may receive a first subset of the plurality of time slots which make up the complete message and which allows the mobile terminal to receive a first portion of the time multiplexed message. The mobile terminal may then determine from the first portion of the time multiplexed message if additional time slots of the time multiplexed message need to be received by the mobile terminal. The mobile terminal only receives remaining portions of the time multiplexed message if it determines that additional portions are to be received. In the event that additional portions are not to be received, the mobile terminal conserves the energy which would have been required to receive and process the additional portions.

One such way of determining if the mobile terminal is to receive the remainder of the time multiplexed message is to utilize the M1 which is the mobile unit identifier address associated with each mobile terminal. The first portion of the message could then contain an address or range of addresses specifying the intended recipient of the message. The mobile terminal would then compare the address or range of addresses from the first portion of the message with its assigned address to determine if additional portions of the message should be received by the mobile terminal.

In the event that not all of the bits of the address assigned to the mobile terminal is included in the first portion of the time multiplexed message, a subset of the bits of a mobile unit identifier of the intended recipient of the message could be included in the first portion of the time multiplexed message. The mobile terminal could then determine if additional portions of the message are to be received by determining if the subset of the bits of the mobile unit identifier contained in the first portion of the time multiplexed message are identical to a corresponding subset of the plurality of bits of the mobile unit identifier assigned to the mobile terminal. This subset of bits may be selected such that a random distribution of possible mobile unit identifier values is obtained from a distribution of mobile terminals. Thus, the likelihood that a mobile terminal will be able to correctly determine that additional portions of a message should not be received by the terminal is approximately equal for all of the mobile terminals in the distribution.

While the above described method of power conservation may be effective in reducing power consumption for messages intended for a specific mobile terminal, power conservation may also be obtained in "broadcast" messages which are to be received by all mobile terminals within a cell. Broadcast messages are periodically transmitted to all mobile terminals within a cell, however, the content of these messages may be the same for a number of broadcasts. Thus, further conservation of energy may be obtained by only receiving the entire broadcast message if the contents of the message has changed in a meaningful manner. Such a determination may be accomplished by determining if the time multiplexed message is a newer version of a previously received time multiplexed message and only receiving all of the message if it is a newer version.

The version of a message may be determined by a mobile terminal by the base station transmitting the message including in the first subset of time slots of the time multiplexed message version information. The mobile terminal would then receive and decode this version information and compare the information to the version information corresponding to the most recently received version of the time multiplexed message received by the mobile terminal. If the version information indicates a newer version of the message then the mobile terminal may receive the entire message and store the message and its associated version information. Thus, the mobile terminal only receives and processes the entire broadcast message if the message contains new information and, thereby, saves the energy which would otherwise be required to receive and process redundant information.

The present invention will now be described with respect to FIG. 6, FIG. 7, FIG. 8 and FIG. 9 which are flowcharts and block diagrams illustrating the operation of a base station and a mobile terminal utilizing the present invention. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based systems which perform the specified functions or steps, or combinations of special purpose hardware and computer instructions. It should be noted that many of the components of the mobile terminal 15 shown in FIG. 8 may be used to construct a base station 42 as shown in FIG. 9 in which like components are designated with the same reference numerals as in FIG. 8 and further designated by a (') to distinguish the base station 42 components from the mobile terminal 15 components The base station 42 illustrated in FIG. 9 encodes and transmits messages to a mobile terminal 15 illustrated in FIG. 8. The operations of this transmission are described FIG. 7 for the base station 42 and FIG. 6 for the mobile terminal 15.

Figure 8:
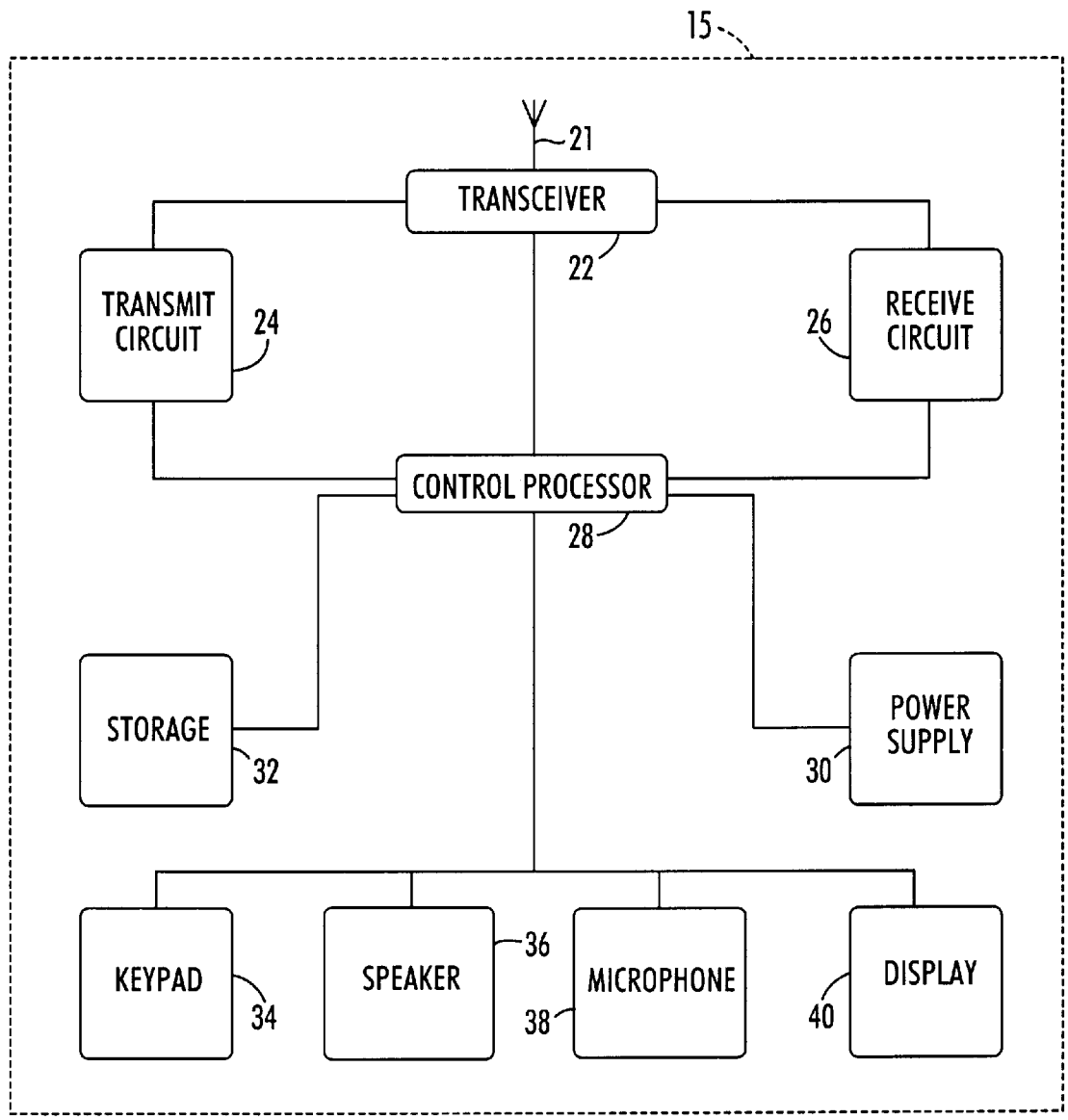
FIG. 8 is a block diagram of a mobile terminal according to the present invention.
Figure 9:
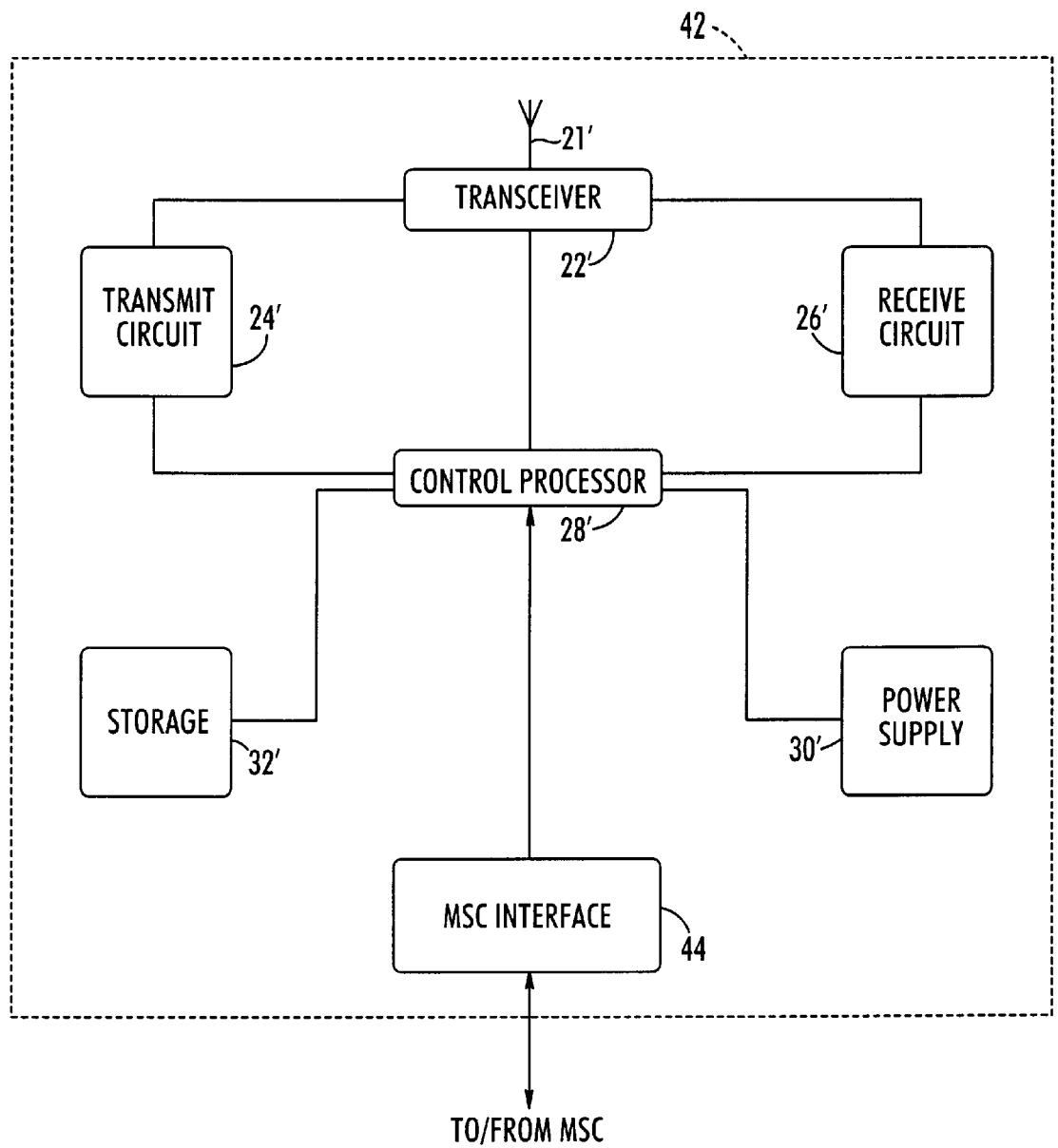
FIG. 9 is a block diagram of a base station according to the present invention.

As seen in FIG. 8, a mobile terminal 15 according to the present invention includes an antenna 21 connected to a transceiver 22 for transmitting and receiving electromagnetic signals. The transceiver 22 is controlled by a control processor 28. Information to be transmitted by transceiver 22 is processed by transmit circuit 24 which provides transmit signal processing. Similarly, information received by transceiver 22 is processed by receive circuit 26 which provides receive signal processing. Each of these circuits is also controlled by control processor 28 which has associated with it memory or other storage means 32 for storing data or processor instructions. Mobile terminal 15 also includes a power supply 30 which typically operates from a rechargeable battery, or other such portable power storage device. Control processor 28 may selectively provide power from power supply 30 to other components of the mobile terminal 15, such as transmit circuit 24, receive circuit 26 and transceiver 22, so as to reduce power consumption as described herein. Mobile terminal 15 may also include input and output devices such as a keypad 34, a speaker 36, a microphone 38 and a display 40 operatively associated with the control processor 28 for interacting with a user.

Similarly, base station 42 illustrated in FIG. 9 includes an antenna 21' connected to a transceiver 22'. The transceiver 22' is controlled by a control processor 28'. Information to be transmitted by transceiver 22' is processed by transmit circuit 24' which provides transmit signal processing. Similarly, information received by transceiver 22' is processed by receive circuit 26' which provides receive signal processing. Each of these circuits is also controlled by control processor 28' which has associated with it memory or other storage means 32' for storing data or processor instructions. Base station 42 also includes a power supply 30' which, unlike mobile terminal 15, need not be portable or operate from a power storage device such as a battery. Accordingly, base station 42 may not have the same power conservation considerations as mobile terminal 15. Base station 42 also includes an MSC interface 44 which communicates information to and from the MSC 20.

Figure 7:
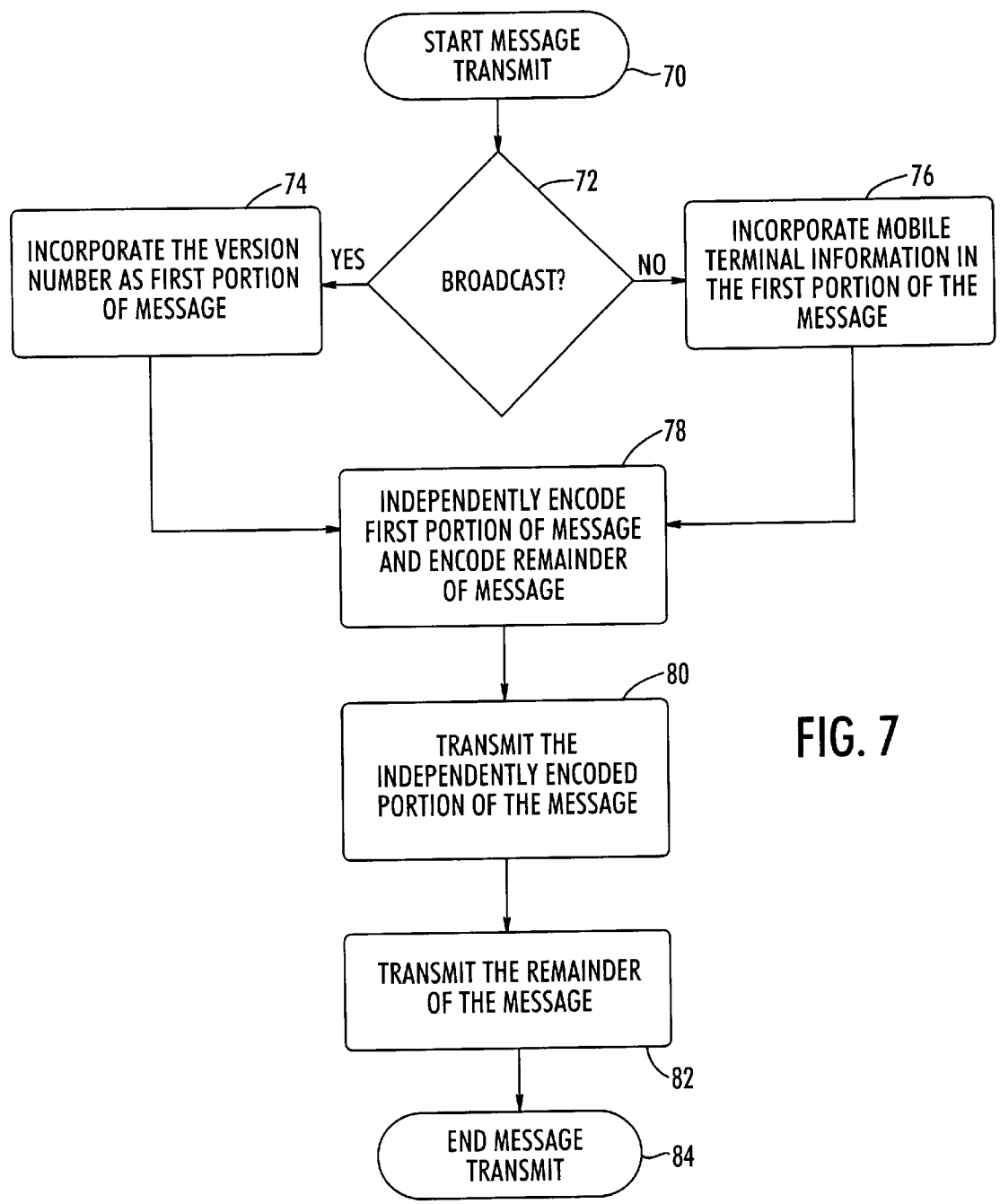
FIG. 7 is a flow chart illustrating the operation of a base station according to one embodiment of the present invention.

Operation of the base station 42 and mobile terminal 15 will now be described with respect to a message transmitted from base station 42 to mobile terminal 15. For example, the message may be a paging message or a broadcast message received by the MSC interface 44 of the base station 42 and provided to the control processor 28' for transmission to a mobile terminal or mobile terminals. As seen in FIG. 7, the transmission of a message to a mobile terminal 15 begins by the control processor 28' determining if the message is a message intended for a specific mobile terminal or if the message is a broadcast message (block 70 and block 72). If the message is a broadcast message then the control processor 28' incorporates the version number of the broadcast message into a first portion of the message (block 74). If the message is intended for a specific mobile terminal, then the control processor 28' incorporates into a first portion of the message to be transmitted terminal specific information such as the address of the mobile terminal or a portion of the mobile unit identifier as described above (block 76).

In either case, the first portion of the message and the remainder of the message are provided to the transmit circuit 24' which independently encodes the first portion of the message and the remainder of the message (block 78). The transmit circuit 24' then provides the two independently encoded portions of the message to the transceiver 22' for transmission over antenna 21' which completes the message transmission operation (block 80, block 82 and block 84).

Figure 6:
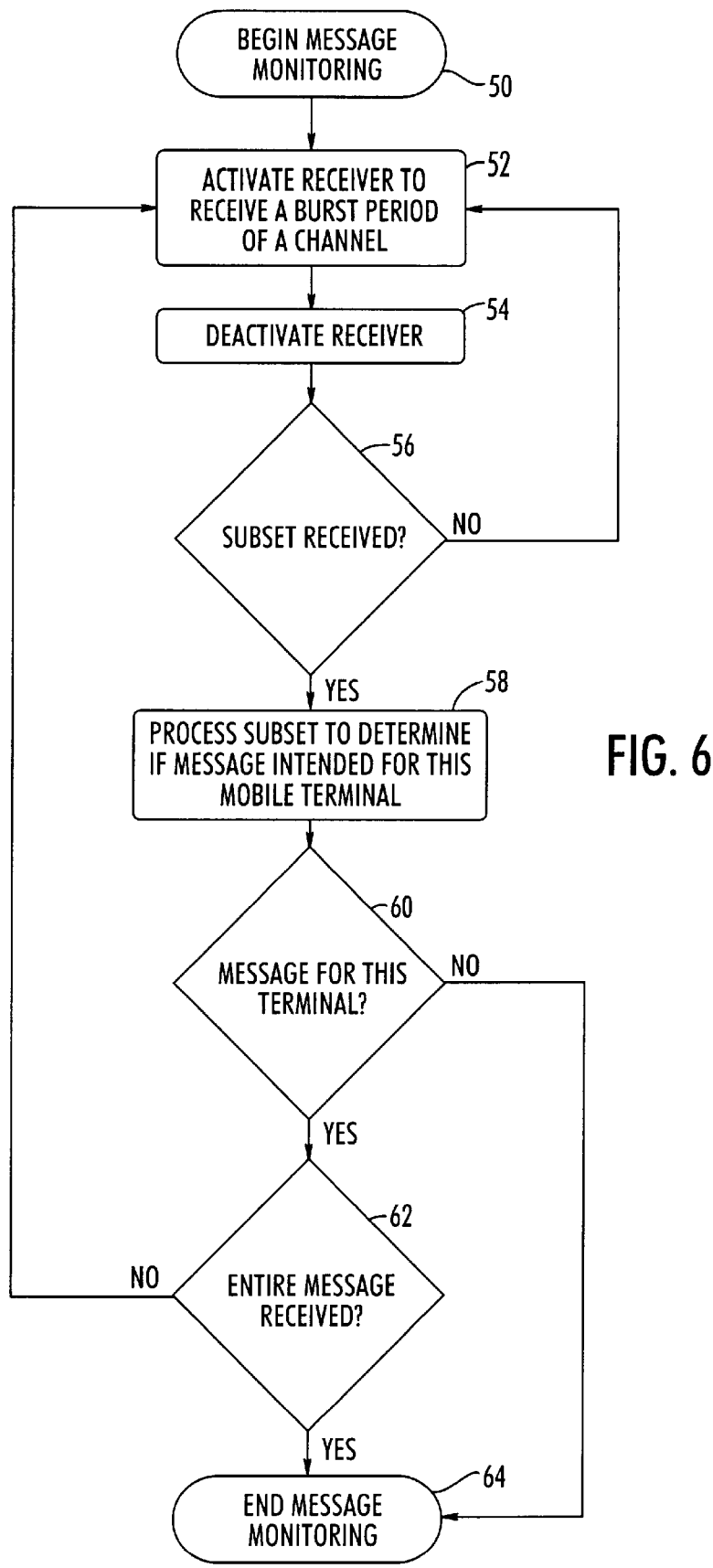
FIG. 6 is a flow chart illustrating the operation of a mobile terminal according to one embodiment of the present invention.

As seen in FIG. 6, the mobile terminal 15 begins receipt of the message from base station 42 by activating the transceiver 22 to receive a time slot of the message (block 50 and block 52). The mobile terminal 15 then deactivates the transceiver 22 having received the time slot (block 54). The mobile terminal 15 then determines if enough of the message has been received to decode a portion of the message (block 56). If enough of the message has not been received to decode a portion of the message then the activation and deactivation of the transceiver 22 is repeated at the appropriate timings to continue to receive time slots of the message (block 56, block 52 and block 54).

When enough time slots have been received to decode a portion of the message, the control processor 28 causes the receive circuit 26 to process the received information to decode the portion of the message (block 58). The control processor 28 then determines from the decoded portion of the message if either a new version of a broadcast message is being transmitted or if the message is directed to the mobile terminal 15. If either is the case, then as seen in block 62, the process of activation and deactivation of the transceiver 28 and receive circuit 26 is continued until the entire message is received. However, if the message does not contain new information or is directed to a different mobile terminal, then the message receipt process is terminated for the present message (block 64). As is illustrated in FIG. 6, if the control processor determines at any point in the message monitoring process that the message need not be completely received by the mobile terminal, then the process may be terminated and the energy conserved which would otherwise be expended receiving and decoding the message.

In addition to the targeted message system for transmitting messages to a mobile terminal described above, the use of the base station 42 and mobile terminal 15 may generally conform to known methods of cellular communication such as GSM described above. These general aspects of the operation of mobile terminal 15 and base station 42 are known to those of skill in the art. Accordingly, the general operation of the base station 42 and the mobile terminal 15 will not be described beyond the relationship to the present invention.

Figure 8A:
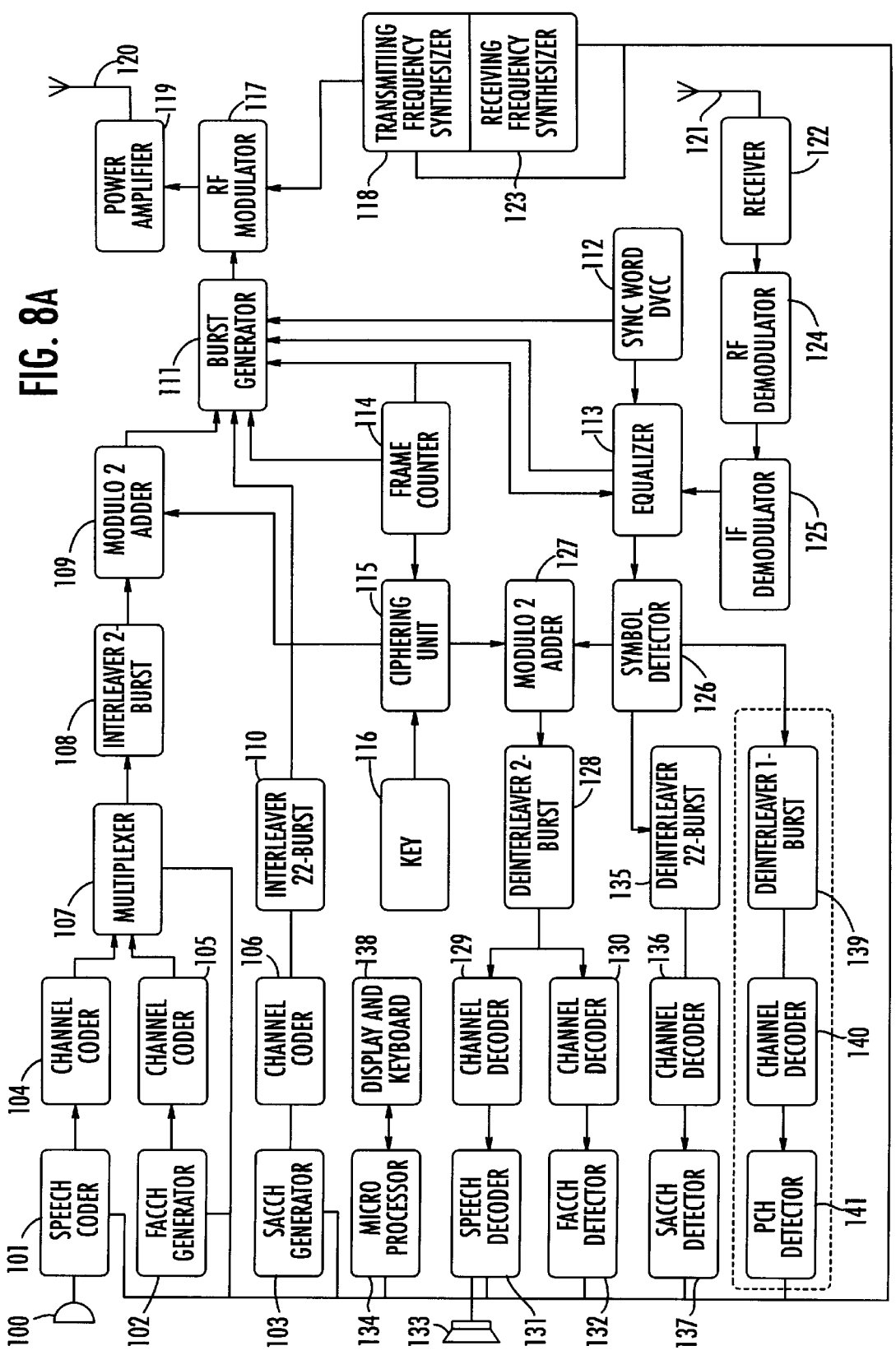
FIG. 8A is a detailed block diagram of one embodiment of the mobile terminal of FIG. 8.
Figure 9A:
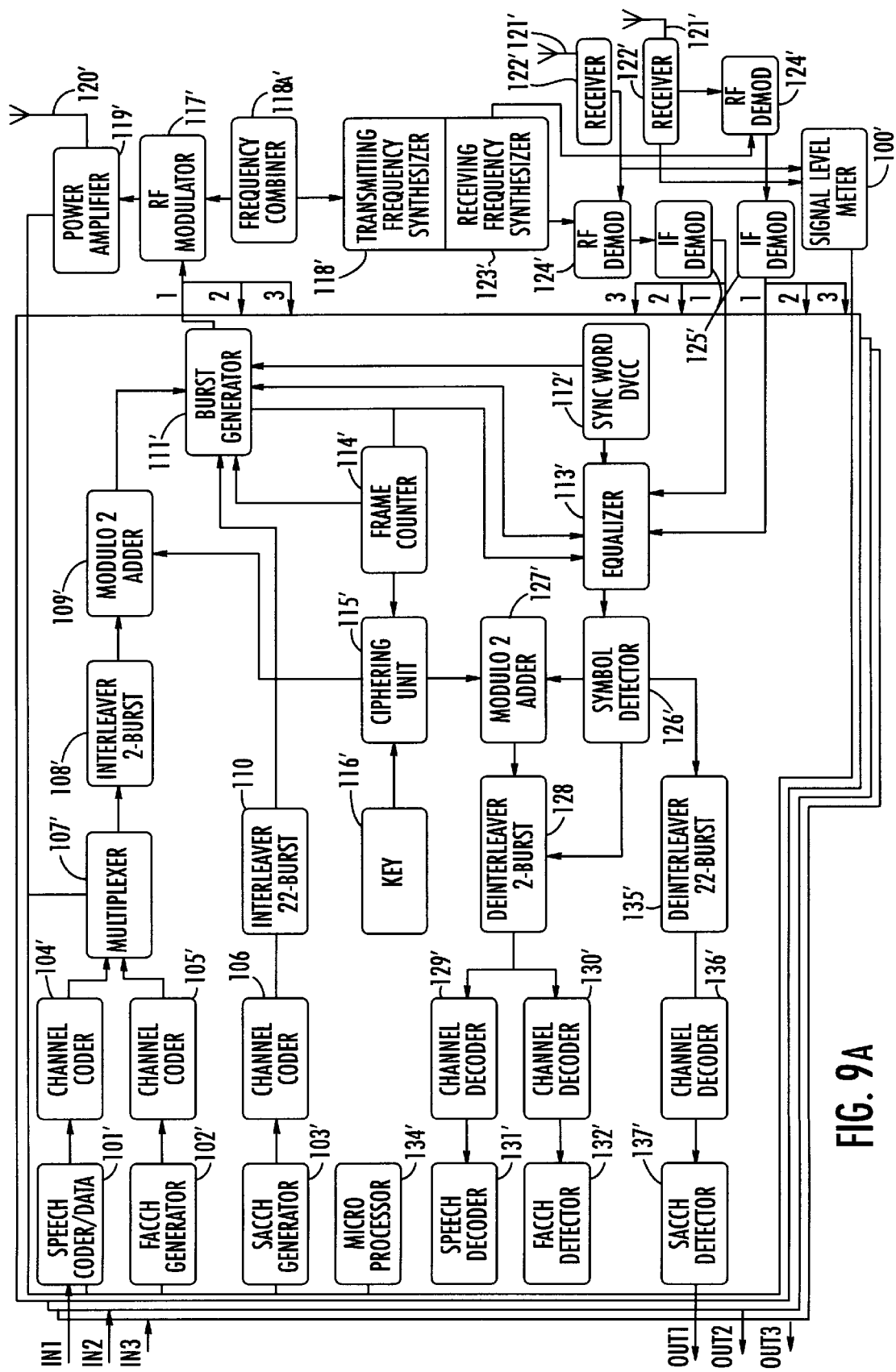
FIG. 9A is a detailed block diagram of one embodiment of the mobile terminal of FIG. 9.

A more detailed block diagram of one embodiment of a mobile terminal according to the present invention is provided as FIG. 8A. Likewise, a more detailed block diagram of one embodiment of a base station according to the present invention is provided as FIG. 9A. As with the mobile terminal 15 and the base station 42, many of the components are common to both devices and carry out the same function in each device. The operation of the mobile terminal of FIG. 8A and the base station of FIG. 9A is described below for both transmission and receipt of control and speech messages to highlight the number of operations and amount of savings which may be achieved by use of the present invention. As the discussion makes clear, the large number of components and operations required to receive and decode a message amplify the need for early detection of whether a message distributed over a number of time slots should be fully received and decoded.

Referring first to FIG. 8A, there is shown a block diagram of an exemplary mobile terminal which is generally compliant with IS-54B and which may be used in accordance with the present invention. In FIG. 8A, certain components which are relevant to communications over digital channels are shown, but it will be appreciated that other digital or analog components may be used in addition to or in place of some of these components. The exemplary mobile terminal of FIG. 8A can transmit and receive speech and control data. The transmit circuitry is generally depicted in the upper half of FIG. 8A while the receive circuitry is generally depicted in the lower half of FIG. 8A.

In the mobile terminal of FIG. 8A, speech from the user is detected as an analog voice signal by a microphone 100 and then passed through one or more voice processing stages (not shown in FIG. 8A) before being provided as input to a speech coder 101. The pre-coding voice processing stages may include audio level adjustment, bandpass filtering and analog-to-digital conversion (e.g., 13-bit PCM format or 8-bit, μlaw format) followed by additional high-pass filtering. The speech coder 101 uses a voice compression algorithm (e.g., RELP or VSELP) to compress the voice signal into a low-rate data bit stream (e.g., from 64 kbps to 8 kbps). The output of the speech coder 101 is fed to a channel coder 104 which applies one or more error protection and/or correction techniques to the data stream. For example, the channel coder 104 may use a rate one-half convolutional code to protect the more vulnerable bits of the speech coder data stream. The channel coder 104 may also use a cyclic redundancy check (CRC) over some of the most perceptually significant bits of the speech coder frame.

As illustrated in FIG. 8A, control data is generated in the mobile terminal in a fast associated control channel (FACCH) generator 102 and a slow associated control channel (SACCH) generator 103, and error-coded in channel coders 105 and 106, respectively. FACCH messages are transmitted in a "blank and burst" mode whereby a burst of speech data is blanked and replaced with a high-rate FACCH burst. By contrast, SACCH messages are continuously transmitted at a slower rate along with each burst of speech data. In the exemplary embodiment shown in FIG. 8A, SACCH messages are fed to a 22-burst interleaver 110 which spreads the SACCH data over 22 time slots prior to transmission.

The coded speech bits from the channel coder 104 and the coded FACCH messages from the channel coder 105 are provided to respective inputs of a time division multiplexer 107 which formats the speech data or FACCH messages into transmit time slots. The output of the multiplexer 107 is fed to a 2-burst interleaver 108 which interleaves the encoded speech or FACCH data over two time slots so as to ameliorate the deteriorative effects of Rayleigh fading (thus providing further protection against channel errors, in addition to error coding). This means that each speech time slot contains data from two consecutive speech coder frames or, similarly, that each FACCH message is spread over two time slots. The output of the 2-burst interleaver 108 is provided as input to a modulo-2 adder 109 where the data is ciphered on a bit-by-bit basis by logical modulo-2 addition with a pseudo-random keystream provided by a ciphering unit 115. The inputs to the ciphering unit 115 may include the value of a frame counter 114 which is incremented once every 20 ms (i.e., once every TDM frame for a full-rate channel), and a secret key 116 which is unique to the mobile terminal. The frame counter 114 is used to update the ciphering code (pseudorandom keystream) once every 20 ms (i.e., once for every transmitted TDM frame). The ciphering code is generated using an encryption algorithm which manipulates the bits of the secret key 116.

The ciphered data from the modulo-2 adder 109 and the interleaved SACCH data from the 22-burst interleaver 110 are provided as inputs to a burst generator 111 which is also provided with a synchronization (sync) word and a digital verification color code (DVCC) from a sync word/DVCC generator 112. The burst generator 111 formats bursts of data each comprising a sync word, DVCC, SACCH data and speech or FACCH data. The sync word is used for time slot identification and synchronization, and equalizer training at the remote receiver (i.e., base station). The DVCC is used to distinguish current traffic channels from traffic co-channels and ensures that the proper RF channel is being decoded by the receiver. The DVCC may be error-coded with, for example, a Hamming code. As will be seen below, the DVCC and sync word are also included in each of the bursts transmitted from the base station to the mobile terminal.

With further reference to FIG. 8A, each of the message bursts from the burst generator 111 is transmitted in one of the time slots of the TDM frame. The burst generator 111 is connected to an equalizer 113 which provides the timing needed to synchronize the transmission of one time slot with the transmission of other time slots. The equalizer 113 detects timing signals sent from the base station (master) to the mobile terminal (slave) and synchronizes the burst generator 111 accordingly. The equalizer 113 may also be used for checking the values of the sync word and the DVCC received from the base station. Both the burst generator 111 and the equalizer 113 are connected to the frame counter 114 for timing purposes.

The message bursts produced by the burst generator 111 are provided as input to an RF modulator 117 which is used for modulating a carrier frequency in accordance with a modulation technique known as π/4 shifted, differentially encoded quadrature phase shift keying (π/4 DQPSK). The use of this technique implies that the information to be transmitted by the mobile terminal is differentially encoded so that 2-bit symbols are transmitted as 4 possible changes in phase (±π/4 and ±3π/4) rather than absolute phases. To minimize errors due to noise in the selected RF channel, Gray coding may be used to map adjacent phase changes to symbols which differ in only one bit (since the most probable errors result in the receiver selecting an adjacent phase, such errors will be limited to single-bit errors). The carrier frequency for the selected RF channel is supplied to the RF modulator 117 by a transmitting frequency synthesizer 118. The burst-modulated carrier signal output of the RF modulator 117 is amplified by a power amplifier 119 and then transmitted to the base station through an antenna 120.

Reception at the mobile terminal is essentially the reverse of transmission. The mobile terminal receives burst modulated signals from the base station through an antenna 121 connected to a receiver 122. a receiver carrier frequency for the selected RF channel is generated by a receiving frequency synthesizer 123 and supplied to a an RF demodulator 124 which demodulates the received carrier signal into an intermediate frequency (IF) signal. The IF signal is demodulated further by an IF demodulator 125 which recovers the original digital information prior to π/4-DQPSK modulation. The digital information is then passed to the equalizer 113 which formats the information into two-bit symbols, and then to a symbol detector 126 which converts the symbols into a single-bit data stream comprised of speech or FACCH data and SACCH data. The symbol detector 126 distributes the FACCH or speech data to a modulo-2 adder 127, and the SACCH data to a 22-burst deinterleaver 135.

The modulo-2 adder 127 is connected to the ciphering unit 115 and is used to decipher the encrypted speech or FACCH data by subtracting, on a bit by-bit basis, the same pseudo-random keystream used by the transmitter in the base station to encrypt the data. The deciphered output of the modulo-2 adder 127 is fed to a 2-burst deinterleaver 128 which reconstructs the speech or FACCH data by assembling bits from two consecutive frames of digital data. The 2-burst deinterleaver 128 is coupled to two channel decoders 129 and 130 which decode the convolutionally-coded speech or FACCH data respectively, and check the CRC bits to determine if any error has occurred (the CRC bits also provide a method for distinguishing speech data from FACCH data). The speech data is fed from the channel decoder 129 to a speech decoder 131 which recovers the original digital speech signal. The signal is then converted to analog and filtered prior to broadcast by a speaker 133. Any FACCH messages are detected by a FACCH detector 132 and forwarded to a microprocessor 134 for appropriate action.

The 22-burst deinterleaver 135 reassembles the SACCH data which is spread over 22 consecutive frames. The output of the 22-burst deinterleaver 135 is provided as input to a channel decoder 136. Any SACCH messages are detected by a SACCH detector 137 and transferred to the microprocessor 134 for appropriate action.

The microprocessor 134 controls the activities of the mobile terminal and communications between the mobile terminal and the base station. Decisions are made by the microprocessor 134 in accordance with messages received from the base station and measurements performed by the mobile terminal. The microprocessor 134 is provided with a memory (not shown) and is also connected to a terminal keyboard input and display output unit 138. The keyboard and display unit 138 allows the user to initiate and respond to calls, and to enter information into the mobile terminal memory.

The base station of FIG. 9A communicates with the mobile terminal of FIG. 8A. As will be appreciated by persons of ordinary skill in the art, there may be certain differences in the construction of the base station and the mobile terminal. For example, as shown in FIG. 9A, the base station may have multiple receiving antennas 121' and associated radio hardware 122'–125' for diversity reception. Furthermore, since the base station supports three (full-rate) digital traffic channels (DTCHs) per RF channel, the baseband processing hardware (border box in FIG. 9A) may be triplicated in the base station, and the IF demodulator 125' may have not just one but three outputs, one for each of the three digital traffic channels. In addition, since the base station usually operates on multiple RF channels, it may include multiple sets of radio channel hardware (baseband processing and radio hardware) as well as a programmable frequency combiner 118A' to carry out the selection of the RF channels to be used by the base station according to the applicable cellular frequency reuse plan. On the other hand, the base station may not include a user keyboard and display unit 138, but may include a signal level meter 100' to measure the strength of the signal received by each the two antennas 121' and to provide an output to the microprocessor 134' (for handoff purposes). Other differences between the mobile terminal and the base station will be readily apparent to those skilled in the art. Otherwise, the operation of the base station is essentially the same with regard to transmission and receipt of control and speech messages as has already been described with respect to the mobile terminal.

Through use of the present invention, the number of time slots received by the receiver 122, demodulated by the RF demodulator 124, demodulated by the IF demodulator 125 and decoded by the symbol detector 126, modulo-2 adder 127, the 2-burst and 22-burst deinterleavers 128 and 135, the channel decoders 130 and 136 and the FACCH and SACCH detectors 132 and 137 may be reduced. Thus, operation of these modules may be avoided if, upon receipt of the first portion of the message, the microprocessor 134 determines that the remainder of the message need not be received. Accordingly, these modules need not be activated and the energy which otherwise would have been utilized to receive and decode any remaining portions of the message may be conserved.

As will be appreciated by those of skill in the art, the present invention is particularly useful when the message is transmitted over a common control channel and more particularly when the message is a page message. The present invention is particularly useful with page messages because the mobile terminal typically monitors each page message to avoid missing an incoming call. Thus, the opportunity to avoid receiving unnecessary time slots increases with the frequency with which the mobile terminal must monitor a type of message, such as the page message.

The amount of savings which may be achieved through the use of the present invention may be seen through the use of an example. In the Asian Cellular Satellite system (ACeS) a 19 time slot long paging message structure (H-PACH) and an 81 time slot broadcast control channel (S-HMBCH) are defined. As with GSM, a frame consists of 8 time slots but a control multi-frame includes 102 frames numbered 0 to 101. Within the control multi-frame one or more time slots are assigned to paging channels. The paging channel structure for one time slot contains 5 paging channels. Each paging channel has a duration of 19 time slots and can carry one paging message per multi-frame. As with GSM, the paging message contains the mobile unit identifier of the mobile terminal being paged. Each mobile terminal monitors one paging channel for a message with a mobile unit identifier matching its own.

According to the present invention, the paging message may be divided into two unequal parts. The smaller of the two parts contains only a portion of the mobile unit identifier. This first portion may be sent on the first four time slots and is coded such that it may be independently decoded. These first four bursts may contain, for example, 7 bits of the 56 bit mobile unit identifier. The mobile terminal then first receives the four bursts, decodes them and compares the received bits its corresponding bits in its mobile unit identifier. If there is an exact match it receives the remaining 15 time slots of the paging message.

With a 7 bit comparison and by selecting these 7 bits from the mobile unit identifier such that a generally random distribution of possible values is found from a typical distribution of mobile terminals, a terminal in standby mode will, on average, only need to read all 19 time slots on $\frac{1}{2}^7$ of the messages. This results in reducing the number of time slots read by the telephone from 19 to an average of 4+15/128=4.12 time slots. Both receiving and signal processing may be reduced by this factor with the resultant power savings.

While the present invention has been described with respect to a particular standard for cellular communications, the present invention should not be construed as limited to any particular standard of communications. The present invention has also been described as dividing a message into two independently decodeable portions, however, as will be appreciated by those of skill in the art, a message may be divided into any number of portions while still benefiting from the advantages of the present invention. Furthermore, if the format of the message is such that it may be decoded as received, the message need not be divided into portions prior to transmission but may be evaluated by the receiving mobile terminal as it is received. Accordingly, as used herein, the term portion of a message refers to any separately distinguishable subset of information of the entire message.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of communicating to a mobile terminal having a receiver for receiving a time multiplexed message distributed over a plurality of time slots, wherein a mobile terminal address is associated with the mobile terminal and wherein the time multiplexed message contains an address distributed over a plurality of time slots specifying an intended recipient of the message, the method comprising:

receiving a first subset of the plurality of time slots so as to receive a first portion of the time multiplexed message corresponding to the first subset of the plurality of time slots, wherein the first portion of the time multiplexed message contains at least a portion of the address specifying the intended recipient of the message;

determining from the at least a portion of the address contained in the first portion of the time multiplexed message if additional time slots of the time multiplexed message need to be received by the mobile terminal; and receiving a second subset of the plurality of time slots so as to receive a second portion of the time multiplexed message if said determining step determines that additional portions of the time multiplexed message are to be received by the mobile terminal.

2. The method according to claim 1, wherein said determining step comprises determining if the address contained in the time multiplexed message is within a range of addresses which includes the mobile terminal address; and wherein said step of receiving a second subset of the plurality of time slots comprises receiving a second subset of the plurality of time slots so as to receive a second portion of the time multiplexed message if said determining step determines that the address contained in the time multiplexed message is within the range of addresses which include the mobile terminal address.

3. The method according to claim 1 wherein the mobile terminal address is a mobile unit identifier comprising a plurality of bits and wherein the first portion of the time multiplexed message contains a subset of the plurality of bits of a mobile unit identifier of the intended recipient of the message; and wherein said determining step comprises determining if the subset of the plurality of bits contained in the first portion of the time multiplexed message are identical to a corresponding subset of the plurality of bits of the mobile unit identifier of the mobile terminal.

4. The method according to claim 3 wherein the bits which comprise the subset of the plurality of bits of a mobile identifier contained in the first portion of the time multiplexed message are selected from the plurality of bits such that a random distribution of possible mobile unit identifier values is obtained from a distribution of mobile terminals.

5. The method according to claim 2, wherein the time multiplexed message comprises a paging message.

6. A method of communicating to a mobile terminal having a receiver for receiving a message distributed over a plurality of time slots in a time division multiple access (TDMA) cellular network, wherein the message contains a mobile unit identifier distributed over a plurality of time slots and associated with an intended recipient of the message and wherein the mobile terminal has a terminal mobile unit identifier associated therewith, the method comprising:

receiving a first subset of the plurality of time slots of a channel in a multi-frame so as to receive a first portion of the time multiplexed message corresponding to the channel;

determining from the first portion of the time multiplexed message if the mobile unit identifier contained in the message corresponds to the terminal mobile unit identifier associated with the mobile terminal such that the remainder of the time slots of the channel need to be received by the mobile terminal; and receiving additional time slots of the channel so as to receive a second portion of the time multiplexed message if said determining step determines that additional portions of the time multiplexed message are to be received by the mobile terminal.

7. The method according to claim 6, wherein the channel comprises a common control channel.

8. The method according to claim 6, wherein the channel comprises a paging channel and wherein the message comprises a paging message.

9. The method according to claim 8, wherein said determining step comprises determining if the paging message has a mobile unit identifier which is included in a range of mobile unit identifiers which includes the terminal mobile unit identifier associated with the mobile terminal.

10. The method according to claim 8 wherein the mobile terminal has associated with it a terminal mobile unit identifier comprising a plurality of bits and wherein the received first portion of the paging message includes a subset of the plurality of bits of the mobile unit identifier associated with an intended recipient; and wherein said determining step comprises determining if the subset of the plurality of bits included in the received first portion of the paging message are identical to a corresponding subset of the plurality of bits of the terminal mobile unit identifier of the mobile terminal.

11. The method according to claim 10 wherein the bits which comprise the subset of the plurality of bits of the mobile identifier associated with the intended recipient are selected from the plurality of bits such that a random distribution of possible mobile unit identifier values is obtained from a distribution of mobile terminals.

12. The method according to claim 6, wherein the first portion of the message and the second portion of the message are separately decodable.

13. A method of communicating to a mobile terminal having a receiver for receiving a time multiplexed message distributed over a plurality of time slots from a base station, wherein a terminal address is associated with the mobile terminal and wherein the time multiplexed message contains an address which specifies an intended recipient of the message, the method comprising:

dividing the message into at least a first independently decodable portion of the message and a second independently decodable portion of the message wherein the first independently decodable portion of the message and the second independently decodable portion of the message each contain at least a portion of the address which specifies the intended recipient of the message from which the mobile terminal can determine if the second independently decodable portion of the message needs to be received by the mobile terminal;

transmitting at a predetermined time corresponding to a first subset of the plurality of time slots the first independently decodable portion of the message; and transmitting at a predetermined time corresponding to a second subset of the plurality of time slots the second independently decodable portion of the message.

14. The method according to claim 13, wherein the address contained in the time multiplexed message contains comprises a plurality of bits which specify the intended recipient of the message;

wherein said dividing step comprises dividing the time multiplexed message into a first independently decodable portion of the message which includes at least a subset of the plurality of bits of the address.

15. The method according to claim 14, wherein the address is a mobile unit identifier.

16. The method according to claim 15 wherein the bits which comprise the subset of the plurality of bits of a mobile identifier associated with the time multiplexed message are selected from the plurality of bits such that a random distribution of possible mobile unit identifier values is obtained from a distribution of mobile terminals.

17. The method according to claim 13, wherein the time multiplexed message comprises a paging message.

18. The method according to claim 13, wherein the message the base station and mobile terminal are included in a time division multiple access (TDMA) cellular network and wherein messages are transmitted through a channel in a multi-frame.

19. The method according to claim 18, wherein the channel comprises a common control channel.

20. The method according to claim 18, wherein the channel comprises a paging channel and wherein the message comprises a paging message.

21. The method according to claim 18, wherein the channel comprises a broadcast channel.

22. The method according to claim 21, wherein the message comprises a repetitively broadcast message.

23. The method according to claim 22 wherein the first separately decodeable portion of the repetitively broadcast message contains version information corresponding to the version of the repetitively broadcast message.

24. A method of communication between a base station and a mobile terminal having a receiver for receiving a time multiplexed message distributed over a plurality of time slots, wherein the base station carries out the steps of:

dividing the message into at least a first independently decodable portion of the message and a second independently decodable portion of the message wherein the first independently decodable portion of the message and the second independently decodable portion each contain at least a portion of an address identifying an intended recipient of the message from which a mobile terminal can determine if the second independently decodable portion of the message needs to be received by the mobile terminal;

transmitting at a predetermined time corresponding to a first subset of the plurality of time slots the first independently decodable portion of the message; and transmitting at a predetermined time corresponding to a second subset of the plurality of time slots the second independently decodable portion of the message; and wherein the mobile terminal carries out the steps of:

receiving the first subset of the plurality of time slots to receive the first portion of the time multiplexed message;

determining from the first portion of the time multiplexed message if additional time slots of the time multiplexed message need to be received by the mobile terminal based on the at least a portion of the address of the intended recipient of the message of the first portion of the message; and receiving the second portion of the time multiplexed message if said determining step determines that additional portions of the time multiplexed message are to be received by the mobile terminal.

25. The method according to claim 24, wherein said determining step comprises determining if the at least a portion of the address of the time multiplexed message contained in the first portion of the message corresponds to a range of addresses which includes the mobile terminal; and wherein said step of receiving the second portion of the time multiplexed message comprises receiving the second portion of the time multiplexed message if said determining step determines that the message contains an address in a range of addresses which include the mobile terminal.

26. The method according to claim 25 wherein the mobile terminal has associated with it a mobile unit identifier comprising a plurality of bits, wherein the at least a portion the address contained in the first portion of the message comprises at least a subset of a plurality of bits of a mobile unit identifier associated with the message, and wherein said determining step comprises determining if the subset of the plurality of bits of the mobile unit identifier included in the first portion of the time multiplexed message are identical to a corresponding subset of the plurality of bits of the mobile unit identifier associated with the mobile terminal.

27. The method according to claim 26 wherein the bits which comprise the subset of the plurality of bits of a mobile identifier associated with the time multiplexed message are selected from the plurality of bits such that a random distribution of possible mobile unit identifier values is obtained from a distribution of mobile terminals.

28. The method according to claim 24, wherein the time multiplexed message comprises a paging message.

29. A mobile terminal for use in a mobile communications network having time multiplexed messages distributed across a plurality of time slots, wherein a terminal address is associated with the mobile terminal and wherein the time multiplexed message contains an address distributed across a plurality of times slots and specifies an intended recipient of the message, comprising:

receiver circuitry for selectively receiving radio communications at predetermined times corresponding to time slots of a time multiplexed message;

means, responsive to said receiver circuitry, for determining from a subset of said plurality of times slots corresponding to a first portion of said time multiplexed message if additional time slots of the time multiplexed message need to be received by the mobile terminal, wherein the first portion of the time multiplexed message contains at least a portion of the address specifying the intended recipient of the message and wherein said means for determining determines if additional time slots need to be received based on the at least a portion of the address; and receiver control means operably associated with said means for determining and said receiver circuitry for selectively causing said receiver circuitry to receive radio communications at a predetermined time corresponding to a second subset of the plurality of time slots wherein said second subset of the plurality of time slots corresponds to a second portion of the time multiplexed message if said means for determining determines that additional time slots of the time multiplexed message are to be received by the mobile terminal.

30. The mobile terminal according to claim 29, wherein said means for determining comprises means for determining if the address contained in the time multiplexed message is within a range of addresses which includes the terminal address of said mobile terminal; and wherein said receiver control means further comprises means for selectively causing said receiver circuitry to receive radio communications at a predetermined time corresponding to a second subset of the plurality of time slots wherein said second subset of the plurality of time slots corresponds to a second portion of the time multiplexed message if said means for determining determines that the address contained in the message is within said range of addresses which include ther terminal address of said mobile terminal.

31. The mobile terminal according to claim 29 wherein the mobile terminal has associated with it a mobile unit identifier comprising a plurality of bits and wherein said means for determining comprises means for determining if a subset of the plurality of bits of a mobile unit identifier associated with the time multiplexed message are identical to a corresponding subset of the plurality of bits of the mobile unit identifier of the mobile terminal.

32. The mobile terminal according to claim 31 wherein the bits which comprise the subset of the plurality of bits of a mobile identifier associated with the time multiplexed message are selected from the plurality of bits such that a random distribution of possible mobile unit identifier values is obtained from a distribution of mobile terminals.

33. The mobile terminal according to claim 29, wherein the time multiplexed message comprises a paging message.

34. The mobile terminal according to claim 29, wherein the first portion of the message and the second portion of the message are separately decodable and wherein said receiver circuitry of said mobile terminal includes decoder means operatively associated with said receiver circuitry for selectively decoding said first portion and said second portion of said message.

35. A base station for use in cellular communications utilizing time multiplexed messages distributed over a plurality of time slots, the base station comprising:

means for dividing the message into at least a first independently decodable portion of the message and a second independently decodable portion of the message wherein the first independently decodable portion of the message and the second independently decodable portion of the message each contain at least a portion of an address associated with the message from which a mobile terminal can determine if the second independently decodable portion of the message needs to be received by the mobile terminal;

means for transmitting at a predetermined time corresponding to a first subset of the plurality of time slots the first independently decodable portion of the message; and means for transmitting at a predetermined time corresponding to a second subset of the plurality of time slots the second independently decodable portion of the message.

36. The base station according to claim 35, wherein an address is associated with a mobile terminal and wherein the time multiplexed message contains an address comprised of a plurality of bits which specify the intended recipient of the message;

wherein said means for dividing comprises means for dividing the time multiplexed message into a first independently decodable portion of the message which includes at least a subset of the plurality of bits of the address.

37. The base station according to claim 36, wherein the address is a mobile unit identifier.

38. The base station according to claim 37 wherein the bits which comprise the subset of the plurality of bits of a mobile identifier associated with the first portion of the time multiplexed message are selected from the plurality of bits such that a random distribution of possible mobile unit identifier values is obtained from a distribution of mobile terminals.

39. The base station according to claim 35, wherein the time multiplexed message comprises a paging message.

* * * * *